United States Patent
Beck

(10) Patent No.: US 8,864,484 B2
(45) Date of Patent: Oct. 21, 2014

(54) LABEL TRANSFER DEVICE FOR AN IML METHOD

(75) Inventor: Nicolas Beck, Unterengstringen (CH)

(73) Assignee: Beck Automation AG, Oberebgstringen (CH)

( * ) Notice: Subject to any disclaimer, the term of this patent is extended or adjusted under 35 U.S.C. 154(b) by 392 days.

(21) Appl. No.: 13/499,141

(22) PCT Filed: Sep. 30, 2010

(86) PCT No.: PCT/CH2010/000235
§ 371 (c)(1),
(2), (4) Date: Jul. 17, 2012

(87) PCT Pub. No.: WO2011/038523
PCT Pub. Date: Apr. 7, 2011

(65) Prior Publication Data
US 2012/0275884 A1 Nov. 1, 2012

(30) Foreign Application Priority Data
Sep. 30, 2009 (CH) ...................................... 1501/09

(51) Int. Cl.
B29C 49/24 (2006.01)
B29C 45/14 (2006.01)
B65H 5/16 (2006.01)
B29C 51/16 (2006.01)

(52) U.S. Cl.
CPC . B29C 45/14008 (2013.01); B65H 2701/11214 (2013.01); B65H 5/16 (2013.01); B65H 2701/192 (2013.01); B29C 2045/14057 (2013.01); B29C 51/167 (2013.01); B29C 2045/14918 (2013.01)

USPC ........ 425/126.1; 425/502; 425/504; 425/520; 425/521

(58) Field of Classification Search
USPC ........... 425/121, 126.1, 126.2, 500, 502–504, 425/512, 520–521, 341
See application file for complete search history.

(56) References Cited

U.S. PATENT DOCUMENTS

| | | | | |
|---|---|---|---|---|
| 2,922,192 | A * | 1/1960 | Morin | 425/508 |
| 6,007,759 | A * | 12/1999 | Ten Tije et al. | 425/129.1 |
| 7,628,597 | B2 * | 12/2009 | Teensma et al. | 425/126.1 |
| 8,616,869 | B2 * | 12/2013 | Houdeshell et al. | 425/126.1 |
| 2006/0163779 | A1 | 7/2006 | Zimmerman | |

FOREIGN PATENT DOCUMENTS

| | | |
|---|---|---|
| DE | 41 41 645 | 6/1993 |
| DE | 43 18 014 | 6/1994 |
| DE | 103 33 157 | 2/2005 |

(Continued)

*Primary Examiner* — Joseph S Del Sole
*Assistant Examiner* — Thukhanh Nguyen
(74) *Attorney, Agent, or Firm* — Greenblum & Bernstein, P.L.C.

(57) ABSTRACT

A transfer device (10) for an IML process for transporting and inserting a label (8) into an annular gap-shaped mold cavity (9) of a multi-part injection molding tool (1), in particular for manufacturing of tubes or other containers of circular, oval, square or other shaped cross-section. This device (10) comprises at least one transfer tube (13) with a suitably shaped annular gap (21) for receiving and transferring a label (8), wherein the annular gap (21) is formed by an inner core tube (22) and an outer tubular shell (23). Ejection means are provided within the annular gap (21) to enable inserting of a label, which is lying therein, into the mold cavity (9). This ejection means may comprise an air pressure wave or at least a displaceably arranged ejector member (24).

10 Claims, 3 Drawing Sheets

(56) References Cited

FOREIGN PATENT DOCUMENTS

Figure 1:
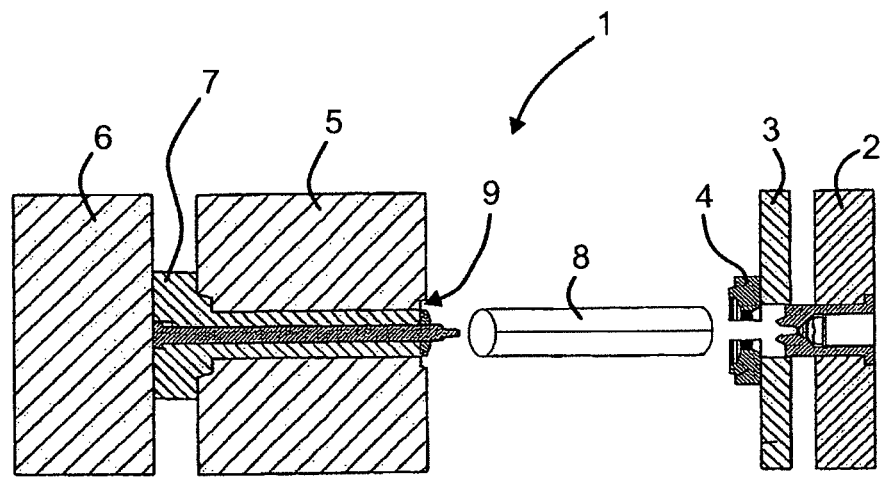

| | | |
|---|---|---|
| DE | 20 2004 020 476 | 10/2005 |
| DE | 10 2004 059 250 | 6/2006 |
| EP | 0 802 032 | 10/1997 |
| EP | 1 523 405 | 12/2003 |
| EP | 1 646 566 | 3/2005 |
| EP | 1 725 467 | 9/2005 |
| GB | 1 387 996 | 3/1975 |
| WO | 2004/007167 | 1/2004 |

\* cited by examiner

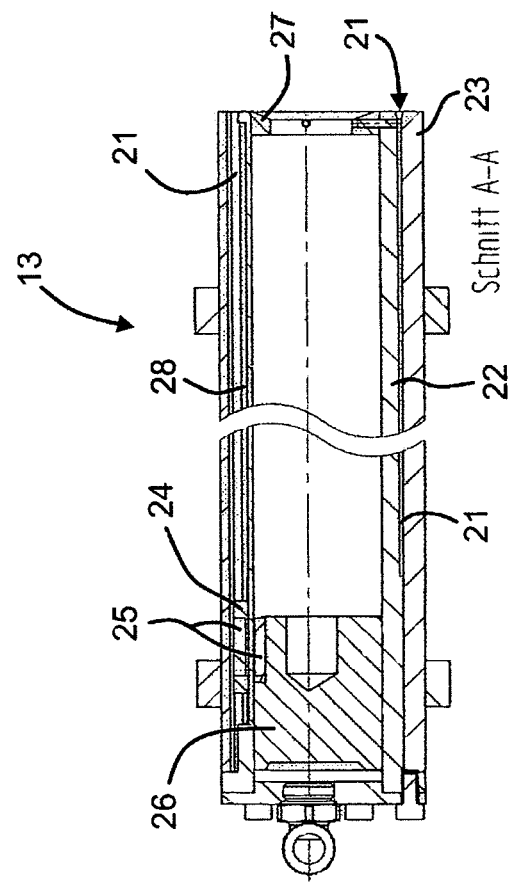
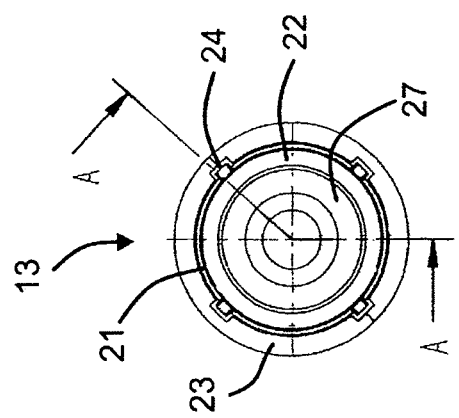
Fig. 3b
Fig. 3a

LABEL TRANSFER DEVICE FOR AN IML METHOD

The present invention relates to a label transfer apparatus for an IML process according to the preamble of claim 1 and in particular to a label transfer apparatus for an IML process for transporting and inserting a label into an annular gap-shaped mold cavity of a multipart injection molding tool for manufacturing containers comprising a shell zone, which has a substantially constant and circular, oval, square or other shaped cross-section—as known from tubes blanks.

Injection molding tools for the manufacture of cartridges are known for example from DE-43'18'014. These tools have essentially a three-part injection mold, i.e. include a head forming plate with slide jaws, a shell forming plate and a support plate for the mold core. With a closed injection mold, the mold core provides together with the shell forming plate an annular gap for forming a cartridge body part. The tip of the mold core together with the slide jaws and the head forming plate provide an annular gap aligned with the cavity for molding the cartridge shoulder, respectively the cartridge end. This injection mold cavity is filled from the head forming plate side with a suitable, i.e. rather rigid plastic material. Unfortunately, these injection molding tools are not useful for the manufacture of tubes blanks, which on the one hand comprise a rather soft and/or flexible fill area or tube body and on the other hand comprise a rather solid, i.e. dimensionally stable sealing area or tube shoulder area. In particular, those tube blanks can not be removed from the mold easily because of the rather soft plastics material and its low shrinkage.

EP-1'523'405 discloses in detail an injection molding tool and a plastics material suitable for forming such a tube body. Unfortunately, the plastics material used for the manufacture of tube blanks shows an undesirably high adhesion and therefore a risk exists that the soft plastics material sticks to the mold cavity after molding and during demolding. In addition, freshly formed tube blanks show a low rigidity, which may be attributed to the elastic material properties as well as to the low shrinkage of the thin-walled tube body. Thus, for the industrial manufacture of tubes blanks special measures are required for demolding the tube blanks.

EP-1'646'566 therefore proposes to insert a rolled sheet or a sleeve formed from a sheet—hereinafter also referred to as label or labeling—into the mold cavity of the injection mold prior to injection molding. Such a sheet, respectively sleeve forms after filling the mold cavity, either the outer surface or the inner surface of the tube blank, depending on whether the label was applied to the mold core or the mold outer wall prior to filling. It is also proposed to provide this label with barrier properties and/or antecedent to print, to texture or to decorate. This approach is sufficiently well known from the "in-mold labeling" technique, short IML technology, for example, in the production of labeled yoghurt cups or other labeled containers. For transferring and for inserting the label into the mold cavities special devices are used, as described for example in EP-0'802'032 with electrostatic transfer means or as described in DE-41'41'645 with pneumatic transfer means.

For injection molding of containers with a cylindrical shape, as cartridges the use of the IML procedure required special tools for transferring and inserting the labels, respectively labeling. Such tools include, for example, a transport and insertion mandrel, whose cross section is a position-dependent variable and as described for example in DE-U-20'2004'020'476 or in DE-10'2004'059'250.

Unfortunately, it became apparent that the IML technology can not be applied easily in the production of thin-walled tube bodies, especially since the label for the tube body must be very thin in order not to impair the flexibility of the tube. The rapid transport and the rapid insertion of the extremely thin labels using electrostatic or pneumatic transfer means leads to failures and to unwanted creases and wrinkles when loading the label.

In addition very large shear forces are exercised on the label while filling the extremely narrow cavities and are causing high rejection rates because of the necessary high filling speed, i.e. the labels are teared, crumpled, form bubbles or are damaged in any way. For this reason in EP-1'725'467 was proposed to use a special material for the labels, in particular an oriented polypropylene (OPP), which has an increased tensile strength in the filling direction. Unfortunately, the generation of creases and wrinkles during the rapid transfer of the label can not be prevented.

It is therefore an object of the present invention to achieve an apparatus for transporting and inserting thin labels to and into the cylindrical, resp. parallel-walled mold cavities of an injection molding tool for the production of thin-walled tube bodies, which do not have the disadvantages of the known devices.

In particular, such a label transfer device is to be achieved, which is suitable for an IML process according to EP-1'646'566.

In addition, such a device—hereinafter also simply called IML label transfer device—is to be achieved, which allows a reduction of the transfer time without creasing, respectively which significantly reduces the rejection rate at shorter cycle times.

In accordance with the invention this object is achieved with an IML transfer device having the features of claim 1 and in particular with a label transfer device comprising at least one transfer tube having an annular gap for receiving and transferring a label, which annular gap lies between an inner core tube and an outer tubular shell and in which annular gap ejector means are provided, which are movable in the longitudinal direction, i.e. working direction.

It is understood that the annular gap has the same geometrical gap shape as the annular gap-shaped mold cavity of the injection molding tool. In the following, the terms annular gap or annular gap-shaped mold cavity shall be used for each gap shape with a closed curve shape, which is suitable for the production of parallel-walled containers comprising a circular, oval, angular, asymmetrical or other cross section. Parallel-walled containers comprise a substantially constant cross-section in there shell zone. As used herein the term annular gap should not be limited to a gap of circular cross-section.

Further developments and special embodiments comprise the features of the dependent claims.

Thus, the ejection means may comprise an air blast, which transports the label from the annular gap into the annular gap-shaped cavity of the injection mold.

In another embodiment, these ejection means comprise at least one ejector member in the form of a sliding ring or in the form of a sliding shoe.

In a preferred embodiment, at least the core tube is provided with at least one longitudinal groove in which the ejecting element is displaceably guided. Likewise, also the shell tube at least may be provided with at least one longitudinal groove, in which the ejecting element is displaceably guided.

It is understood that the ejecting element may be driven mechanically and/or pneumatically and/or magnetically. Suitable means are to be seen in movable pins, controllable air arrangements or magnets.

In a particular embodiment, the ejecting elements are magnetically coupled with a piston, which is slidable mounted in the core tube. For this purpose the displaceable piston carries at corresponding locations its own magnetic elements.

In a further development of this preferred embodiment this piston is pneumatically displaceable. Therefore the rear interior of the transfer tube is provided with a pneumatic actuator, respectively a suction device. It is understood that the piston may be driven hydraulically or mechanically, for example with a servo drive, in particular with a steep spindle.

In a particular embodiment, the core tube is slotted and the ejector elements, which are guided in the annular gap, are tightly attached to the piston.

In another particular embodiment, the tubular shell is slotted. The ejector elements, which are guided in the annular gap, are tightly connected with a slide, which is arranged outside of the tubular shell. This slide can be actuated mechanically, hydraulically or pneumatically. In this embodiment, the core tube does not need to be hollow, but may also be a solid profile.

In further developments of the inventive embodiment means are provided to control the temperature of the ring gap, in particular in order to heat this annular gap and to reduce the moisture within the annular gap and/or to increase the sliding ability of the label.

It is understood that the device in accordance with the invention is usable not only for the manufacture of soft tube bodies, but also in the manufacture of all kinds of parallel-walled articles, on which very thin and/or soft labels must be applied. Such objects are, for example, elastic sleeves for the dispensation of food or beverages (aerospace food, chocolate paste, etc.) or small-sized dispensers (syringes) for pharmaceutical or medical substances of any kind or parallel-walled housings for everyday's use, such as pens, cigars, glue sticks, etc.

Figure 2:
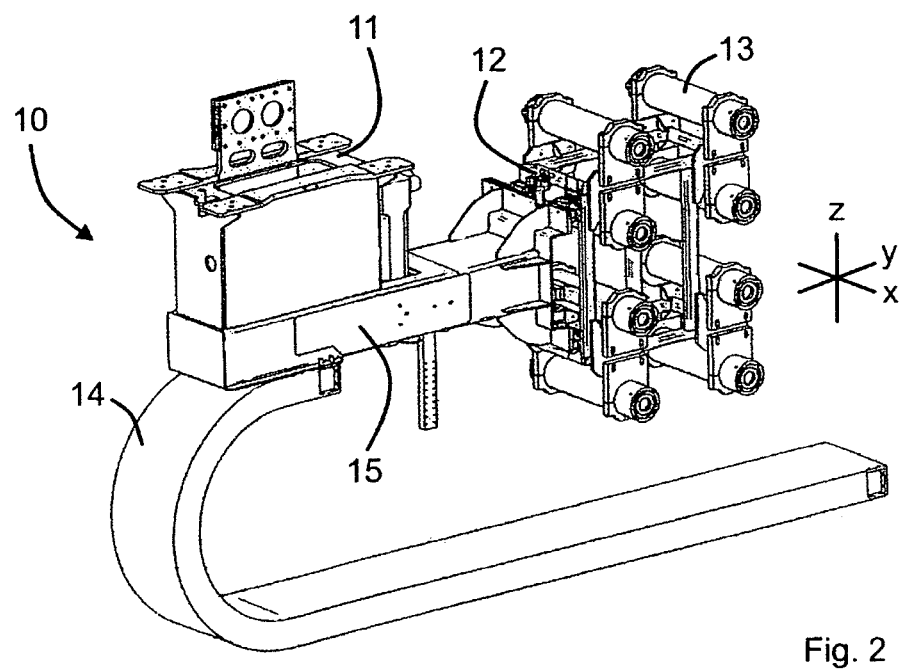
Figure 4:
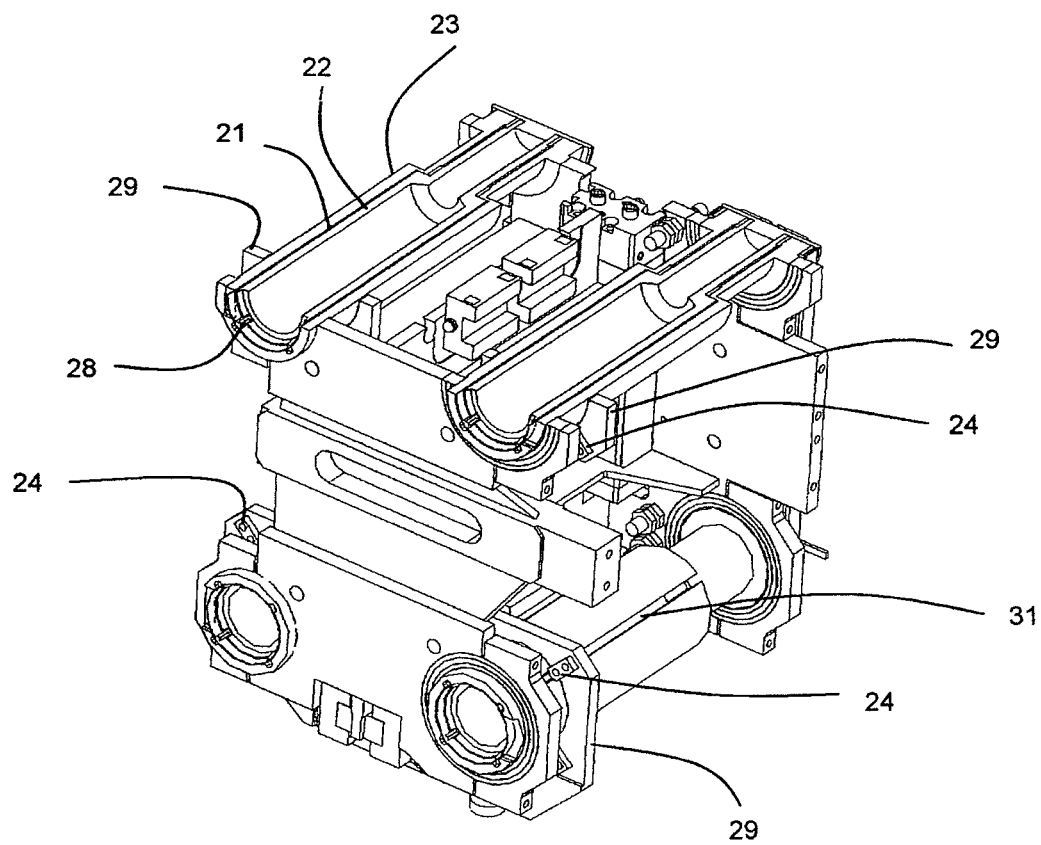

In the following the invention shall be explained in more detail with reference to an exemplary embodiment and with reference to the figures. Thereby:

FIG. 1: shows a schematic representation of an injection molding tool as known in the art;

FIG. 2: shows a three-dimensional view of a schematic representation of an IML-transfer device in accordance with the invention;

FIG. 3*a*: shows a cross section through a schematic representation of a transfer tube according to the invention;

FIG. 3*b*: shows a broken longitudinal section through a schematic representation of a transfer tube according to the invention;

FIG. 4: shows a three-dimensional view of a schematic representation of a preferred embodiment of the transfer device in accordance with the invention and with a sectional view.

The schematic representation shown in FIG. 1 clarifies the well known assembly of an injection molding tool 1, which is suitable for the IML process for the manufacture of cartridge- or tube blanks. This tool 1 includes a base or basic plate 2, which is tightly attached to the hot runner block of an injection molding machine (not shown). A slide plate 3, which is slidable—here slightly opened—bears the slide jaws 4, in which the shape of the head of the tube blank to be produced is designed. On another tool plate—the core support plate 6—a mold core 7 is mounted. This mold core 7 forms together with the mold core plate 5 an annular gap-shaped mold cavity 9, which forms the tube body of the tube blank to be produced. For the injection molding process all plates 2, 3, 5 and 6 form-fit together and form a closed mold cavity for the manufacture of a tube blank. For the ejection of the molded tube blank, the core support plate 6 together with the mold core 7 is slightly separated from the mold core plate 5 before these two plates 5 and 6 are both withdrawn and the slide plate 3 is separated from the base plate 2, respectively is separated from the nozzle and before the slide jaws 4 are opened. Only after these steps the mold core plate 5 is withdrawn completely, i.e. pulled back together with the core support plate 6 in order to completely release the tube blank. The removal position shown in FIG. 1 is suitable in a specific way to insert a label 8 into the annular gap-shaped mold cavity 9 before the injection molding tool 1 is closed for the next production cycle.

This FIG. 1 shows that the insertion of a label 8 in the open cavity of an injection mold for parallel-shaped bodies makes necessary an unusually high precision and special measures to overcome the shear forces. This is of particular importance in the production of moldings from soft elastic material.

The IML label transfer device 10 shown in FIG. 2 is in accordance with the invention and has an attachment 11 for a main arm 15, on which front end, a transfer tube carrier 12 is moveably fixed. This transfer tube carrier 12 can be moved with the aid of the main arm 15 in the y-direction, i.e. in a transversely to the working direction (x-direction) of an injection molding tool 1, into an acceptance or transfer position. It is understood that this acceptance position is arranged in a label station (not shown), which is located in a side of the injection molding tool 1 in order to provide the transfer tubes 13 of the transfer tube carrier 12 with a label 8, while the transfer position is within the opened injection mold 1 in order to insert the label 8 into the ring-shaped mold cavities 9. In addition, the transfer tube carrier 12 can in the transfer position move relative to the main arm 15 in the vertical (z-direction) and horizontal (x-direction) direction. On this main arm 15 a flexible energy chain 14 is fastened, on which all required control wires and supply cables are carried. The detailed construction and control means of such an IML label transfer device 10 lies within the range of the normal skill of the man in the art and is not subject of the present invention.

FIGS. 3*a* and 3*b* show the assembly of a transfer tube 13 according to the invention in detail. This transfer tube 13 comprises an outer tubular shell 23 which is fixed to the transfer tube support 12 and surrounds an inner core tube 22. The tubular shell 23 and the core tube 22 are designed such that between the tubular shell 23 and the core tube 22, an annular gap 21 is formed, which is aligned in the transfer position with the annular gap-shaped cavity 9 of the molding tool 1. This annular gap 21 can accommodate a label 8 and allows this label 8 to move precisely and without damage or deformation into the annular gap-shaped cavity 9 of the molding tool 1 by using the ejector means according to the invention. Therefore the core tube 22 comprises, as apparent from the shown embodiment, at least one longitudinal groove 28 in which an ejector member acting as ejection means 24 is displaceably arranged. It is understood that the outer tubular shell 23 may be provided with at least one longitudinal groove 28, in which the ejector element 24 is arranged displaceably. In the shown embodiment, the ejector member 24 is magnetically slidable and is carrying a permanent magnet of a magnetic pair 25. The corresponding other permanent magnet is directly opposite secured to a displaceable piston 26 which is slidable mounted inside the core tube 22. When piston 26 is displaced in direction of ejection, the ejector element 24 is dragged because of the magnet pair 25 and label 8, which is lying in the annular gap 21, is thrown out from this annular gap 21. A stop ring 27 prevents that the pneumatically driven piston 26 falls out from the interior of the core tube 22. This concentric structure can be realized in a simple manner and with high precision, for example, by conical contact faces between the core tube 22 and the outer shell tube 23 and allows therefore to quickly transfer extremely thin, i.e. less than 0.05 mm, labels 8 without damaging them.

It is understood that the transfer tube 13 may be provided with a plurality of ejector members 24. In a preferred embodiment, the transfer tube 13 is provided with four symmetrically distributed ejector members 24. In is another embodiment a single annular ejector 24 is provided instead of a plurality of individual ejector members 24. The expert in the art will provide appropriate arrangements which mechanically or pneumatically drive the ejector members 24, where desired and without becoming inventive. In a particular embodiment of the apparatus in accordance with this invention, the ejection means comprise merely an air pressure wave. Through the specific generation of a air pressure wave, respectively an uniformly propagating pressure wave with an uniformly propagating wave front within the annular gap 21, the label 8 can be ejected from the annular gap 21 and transferred into the mold cavity 9 of the injection mold without additional ejector member 24. The generation of a suitable air pressure wave lies within the range of the normal skill and action of the expert skilled in the art.

In a particular development, the outer tubular shell 23 and/or the core tube 22 comprises at least one thermocouple to regulate the temperature within the annular gap 21 and thus to minimize the static friction, i.e. to facilitate the removal of the label 8. Further measurements to avoid unwanted friction, in particular by electrostatic charge are sufficiently well known to the man skilled in the art and are not subject of the present invention.

FIG. 4 shows a preferred embodiment of a transfer tube carrier 12 of the apparatus in accordance to the invention comprising four transfer tubes 13, whereof two in a longitudinal section. Each of these transfer tubes 13 comprises a core tube 22 and an outer tubular shell 23, between which an annular gap 21 is formed. The precision of the shape of this annular gap is ensured, in particular, by center fitting the core tube 22 with its rear side end in the outer shell tube 23. In this embodiment, the shell tube 23 is slit, i.e. includes a slot 31, through which an ejector member 24 reaches. This ejector member 24 is fixed to a slide 29 (here a plate) and protrudes through the annular gap 21 and preferably terminates in a longitudinal groove 28, which is provided in the core tube 22 without touching the shell tube 23 and the core tube 22. In the illustrated embodiment four such slots 31 are provided. The slide 29 can be moved along the shell tube 23 and is driven mechanically or pneumatically. When the transfer tube carrier 12 rests in its receiving position the slide 29 is retracted, i.e. allows the insertion of the label 8 in the respective annular gap 22 of the transfer tubes 13. It is understood that the slide 29 is retracted only to the extent as required, i.e. only to the extent that the ejector members 24 form a stop to the label 8 introduced.

When the transfer tube carrier 12 is in its transfer position, than the slide 29 is moved forward (in the x-direction). The ejector member 24 attached therewith pushes the label 8 in the annular gap 9 of the injection mold 1.

In a further layout of this embodiment, the core tube 22 comprises slits and the ejector member 24 are fixed on the piston 26.

Another layout of this embodiment comprises an ejector member 24, which annularly surrounds the core tube 22 and preferably is directly driven pneumatically. It is understood that the core tube 22 also may be formed as a full profile if no internal piston 26 is required for moving the at least one ejector member 24.

The advantages of the device according to the invention are immediately apparent to those skilled in the art and are particularly to be seen in the quick, easy, secure and wrinkle-free transfer of very thin labels. In particular, the ejection means according to the invention generate no local increased sliding forces on the labels to be transferred. The rejection rate is substantially reduced and the cycle times can further be shortened. The design in accordance with the invention allows to form a high-precision ring gap in the simplest way thanks to the centered connection between the core tube and outer shell tube.

REFERENCE SIGNS

1: multi-part injection molding tool
2: base plate
3: slide plate
4: slide jaws
5: mold core plate
6: core support plate
7: mold core
8: label
9: annular gap-shaped mold cavity
10: IML label transfer device
11: attachment
12: transfer tube carrier
13: transfer tubes
14: flexible energy chain
15: main arm
21: annular gap
22: core tube
23: outer tubular shell
24: ejector member
25: permanent magnet of a magnetic pair
26: piston
27: abutting ring
28: longitudinal groove
29: slide
31: slot

The invention claimed is:

1. Label transfer device (10) for an IML process for transporting and inserting a label (8) into an annular gap-shaped mold cavity (9) of a multi-part injection mold (1) for manufacturing of parallel-walled objects, in particular containers comprising a shell region, having a substantially constant, i.e. with a uniform and circular, oval, square or other shaped cross-section, characterized in that said device is provided with at least one transfer tube (13) with an annular gap (21) for receiving and transferring a label (8), which annular gap (21) is arranged between an inner core tube (22) and an outer tubular shell (23), in which annular gap (21) ejection means are provided.

2. Label transfer device (10) according to claim 1, characterized in that said ejection means comprise an air pressure wave.

3. Label transfer device (10) according to claim 1, characterized in that the ejection means comprise at least one ejector member (24).

4. Label transfer device (10) according to claim 3, characterized in that at least the core tube (22) is provided with at least one longitudinal groove (28), along which the ejector member (24) is guided displaceably.

5. Label transfer device (10) according to claim 3, characterized in that at least the tubular shell (23) is provided with at least one longitudinal groove (28), along which the ejector member (24) is guided displaceably.

6. Label transfer device (10) according to claim 3, characterized in that the ejector member (24) is coupled with a piston (26), which is supported within a core tube (22) in a displaceable manner and is driven mechanically, hydraulically or pneumatically.

7. Label transfer device (10) according to claim 6, characterized in that the ejector member (24) is magnetically coupled with the piston (26), wherein the piston (26) supports at least one magnetic element (25).

8. Label transfer device (10) according to claim 6, characterized in that the core tube (22) is slotted and the ejector element (24) is fastened to the piston (26).

9. Label transfer device (10) according to claim 3, characterized in that the outer tubular shell (23) is slotted and the ejector member (24) is mounted at a slide (29), which is arranged at the outside of the tubular shell (23), which slide (29) is driven mechanically, hydraulically or pneumatically.

10. Label transfer device (10) according to claim 3, characterized in that the ejector member (24) annularly surrounds the core tube (22).

* * * * *